United States Patent
Chang et al.

(10) Patent No.: US 8,542,328 B2
(45) Date of Patent: Sep. 24, 2013

(54) PIXEL STRUCTURE OF LIQUID CRYSTAL DISPLAY PANEL

(75) Inventors: Tsu Chiang Chang, Taipei (TW); Chao Hui Wu, Taoyuan County (TW)

(73) Assignee: Hannstar Display Corp., Taipei County (TW)

( * ) Notice: Subject to any disclaimer, the term of this patent is extended or adjusted under 35 U.S.C. 154(b) by 554 days.

(21) Appl. No.: 12/730,898

(22) Filed: Mar. 24, 2010

(65) Prior Publication Data

US 2011/0063535 A1  Mar. 17, 2011

(30) Foreign Application Priority Data

Sep. 11, 2009  (TW) .................................. 98130656 A

(51) Int. Cl.
G02F 1/1343 (2006.01)
G02F 1/1333 (2006.01)

(52) U.S. Cl.
USPC ............................................. 349/39; 349/111

(58) Field of Classification Search
USPC ...................... 349/38, 39, 110, 111
See application file for complete search history.

(56) References Cited

U.S. PATENT DOCUMENTS

| 6,046,063 A | 4/2000 | Jun et al. |
| 2005/0134779 A1* | 6/2005 | Park et al. ..................... 349/139 |
| 2007/0057257 A1 | 3/2007 | Kim |

FOREIGN PATENT DOCUMENTS

| TW | 200736715 | 3/1995 |
| TW | 200933272 | 1/2008 |

* cited by examiner

*Primary Examiner* — Richard Kim
*Assistant Examiner* — Michael Inadomi
(74) *Attorney, Agent, or Firm* — Lowe, Hauptman & Ham, LLC

(57) ABSTRACT

A pixel structure of a liquid crystal display panel includes a substrate, a first metallic layer, a light shielding element, a second metallic layer and a pixel electrode. The first metallic layer and the light shielding element are disposed above the substrate. The second metallic layer is disposed above the light shielding element, and includes first and second data lines. The first data line is disposed along the light shielding element, and is partially overlapped with the light shielding element. The second data line is parallel to the first data line. A first portion of the pixel electrode is overlapped with the first data line, and is not overlapped with the light shielding element. A second portion of the pixel electrode is overlapped with the light shielding element, and is not overlapped with the first data line.

15 Claims, 11 Drawing Sheets

PIXEL STRUCTURE OF LIQUID CRYSTAL DISPLAY PANEL

CROSS REFERENCE TO RELATED APPLICATION

This application claims the priority benefit of Taiwan Patent Application Serial Number 098130656, filed on Sep. 11, 2009, the full disclosure of which is incorporated herein by reference.

TECHNICAL FIELD

The invention is related to a liquid crystal display panel, and more particularly to a pixel structure of a liquid crystal display panel, wherein the coupling ratio of two data lines in a single pixel region can be reduced.

BACKGROUND

Accompanying with the improvement of electronic technology, especially the popularity of portable electronic products in daily life, there is an increased demand for light, compact and low power consumption display devices. Since a liquid crystal display has the merits of low power consumption, compact and light, it is suitable for this kind of electronic products and even gradually replaces conventional cathode ray tube (CRT) devices.

Since the pixel aperture ratio is an important factor that has an effect on the characteristics of liquid crystal displays, several kinds of pixel structures have been proposed so far to increase the pixel aperture ratio. Referring to FIGS. 1 and 2, FIG. 1 shows a plan view of a conventional pixel structure with high aperture ratio while FIG. 2 shows a cross-sectional view taken along the line II'-II' of FIG. 1. The pixel structure 9 includes two gate lines 91a, 91b and one conductive line 92 formed parallel in a row, and includes two data lines 93a, 93b perpendicular to the gate lines 91a, 91b and the conductive line 92, wherein the conductive line 92 has a first part 92a serving as a common line and has a second part 92b serving as a storage capacitor, and the width of the second part 92b is larger than that of the first part 92a. The two gate lines 91a, 91b and the two data lines 93a, 93b define a pixel region.

A thin film transistor 95 is disposed adjacent to an intersection of the gate line 91a and the data line 93a and includes a gate electrode extended from the gate line 91a, a semiconductor layer 951 formed above the gate electrode. An insulating layer 98 is sandwiched between the semiconductor layer 951 and the gate electrode, as shown in FIG. 2. A source electrode 953 and a drain electrode 952 are overlapped with portions of two sides of the semiconductor layer 951 respectively. An organic insulating layer 97 is formed over the pixel region and a pixel electrode 96 is further stacked thereon. A contact hole 99 is provided through the organic insulating layer 97 so as to electrically connect the pixel electrode 96 to the source electrode 953, wherein the pixel electrode 96 is overlapped with the two gate lines 91a, 91b and the two data lines 93a, 93b respectively, thereby increasing the aperture ratio of the pixel structure 9.

However, according to the above pixel structure 9, an organic insulating layer 97 is disposed to decrease the parasitic capacitance Cpd existed between the pixel electrode 96 and the data lines 93a, 93b, thereby reducing crosstalk. Referring to FIG. 3, it shows the connection between capacitors in a pixel region. With reference to this drawing, the coupling ratio of the data lines 93a, 93b in a single pixel region can be obtained as $(Cpd1+Cpd2)/[(Cpd1+Cpd2)+Cst+Clc+(Cgs+Cpg)]$, wherein the pixel region is defined by two adjacent gate lines 91a, 91b and two adjacent data lines 93a, 93b, $(Cpd1+Cpd2)$ is the parasitic capacitance induced by the overlapping of a pixel electrode with two data lines of this pixel region, Cst is the storage capacitance of the pixel region, Clc is the capacitance of liquid crystal unit, Cgs is the parasitic capacitance between a gate electrode and a source electrode of the thin film transistor, Cpg is the capacitance between a pixel electrode and a gate electrode of the thin film transistor. If the coupling ratio in a single pixel region becomes smaller, the crosstalk becomes smaller. Also, according to the above equation, the coupling ratio can be reduced by decreasing the value of $(Cpd1+Cpd2)$ or by increasing the value of Cst.

Referring to FIGS. 1 and 2 again, although the parasitic capacitance Cpd between the pixel electrode 96 and the data lines 93a, 93b can be reduced by disposing an organic insulating layer 97 in the pixel structure 9, the storage capacitance Cst between the pixel electrode 96 and the second part 92b of the conductive line 92 will also be reduced simultaneously. Therefore, the coupling ratio in a single pixel region is not able to be efficiently reduced.

Accordingly, there exists a need for a pixel structure of a liquid crystal display panel capable of solving the above-mentioned problems.

SUMMARY

The present invention provides a pixel structure of a liquid crystal display panel includes a substrate, a first metallic layer, a first light shielding element, a second metallic layer and a pixel electrode. The first metallic layer is disposed above the substrate and includes first and second gate lines laterally parallel to each other. The first light shielding element is disposed above the substrate. The second metallic layer is disposed above the first light shielding element, and includes first and second data lines. The first data line is disposed along the first light shielding element, and is partially overlapped with the first light shielding element. The second data line is parallel to the first data line, wherein the first gate line, the second gate line, the first data line and the second data line together define a pixel region. The pixel electrode has a first side, which includes a first portion and a second portion. The first portion is overlapped with the first data line, and is not overlapped with the first light shielding element. Also, the second portion is overlapped with the first light shielding element, and is not overlapped with the first data line. The pixel structure further includes a second light shielding element parallel to the first light shielding element. The second data line is disposed along the second light shielding element, and is partially overlapped with the second light shielding element. The pixel electrode has a second side, which includes a third portion and a fourth portion, wherein the third portion is overlapped with the second data line, and the third portion is not overlapped with the second light shielding element.

The liquid crystal display panel is operated in a dot inversion mode or a column inversion mode. By utilizing the two adjacent pixel regions having opposite polarity, the coupling ratio of two data lines in a single pixel region can be reduced.

BRIEF DESCRIPTION OF THE DRAWINGS

Embodiments of the present invention are illustrated by way of example, and not by limitation, in the figures of the accompanying drawings, wherein elements having the same reference numeral designations represent like elements throughout and wherein:

FIGS. 5a and 5b respectively show that the liquid crystal display panel is operated in a dot inversion mode and a column inversion mode, and two adjacent pixel regions having opposite polarity;

DETAILED DESCRIPTION OF THE PREFERRED EMBODIMENT

The foregoing, as well as additional objects, features and advantages of the invention will be more apparent from the following detailed description, which proceeds with reference to the accompanying drawings. In addition, it should be noticed that, wherever possible, the same reference numbers will be used throughout the drawings to refer to the same or like parts.

Figure 1:
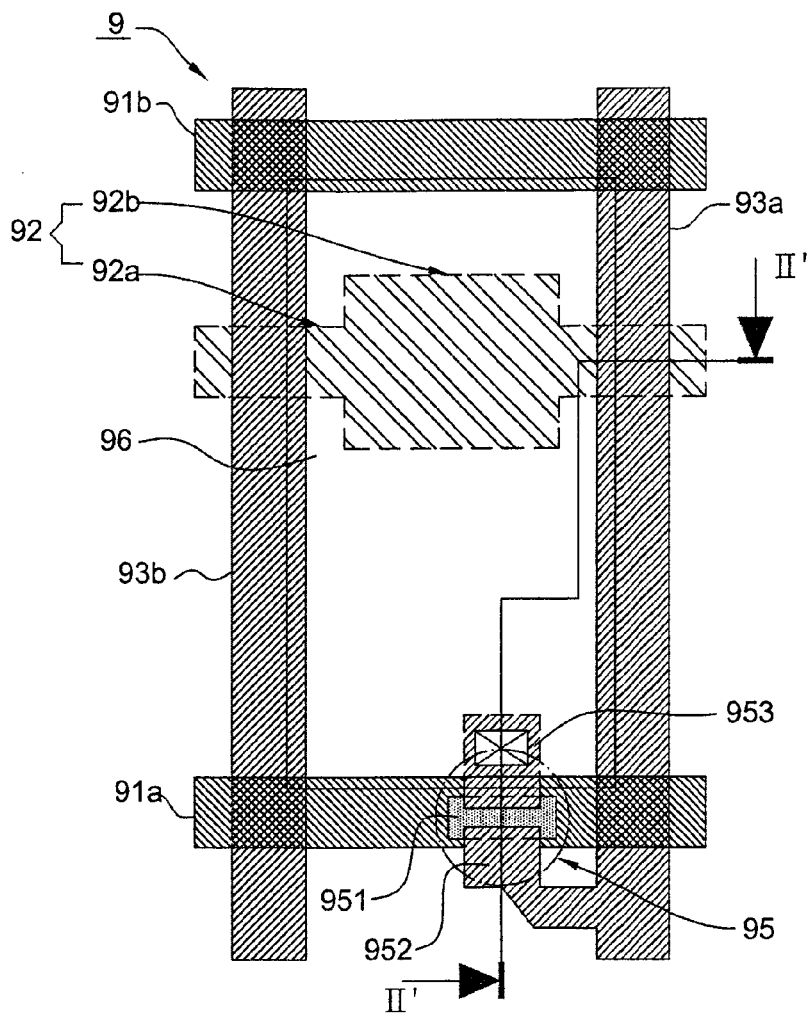
FIG. 1 is a plan view of a pixel structure of a liquid crystal display panel in the prior art.
Figure 2:
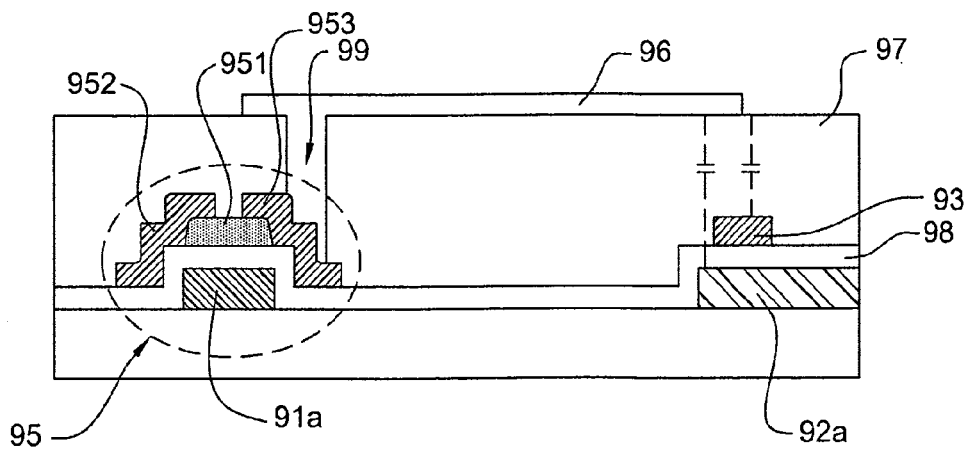
FIG. 2 is a cross-sectional view taken along the line II'-II' of the pixel structure shown in FIG. 1.
Figure 3:
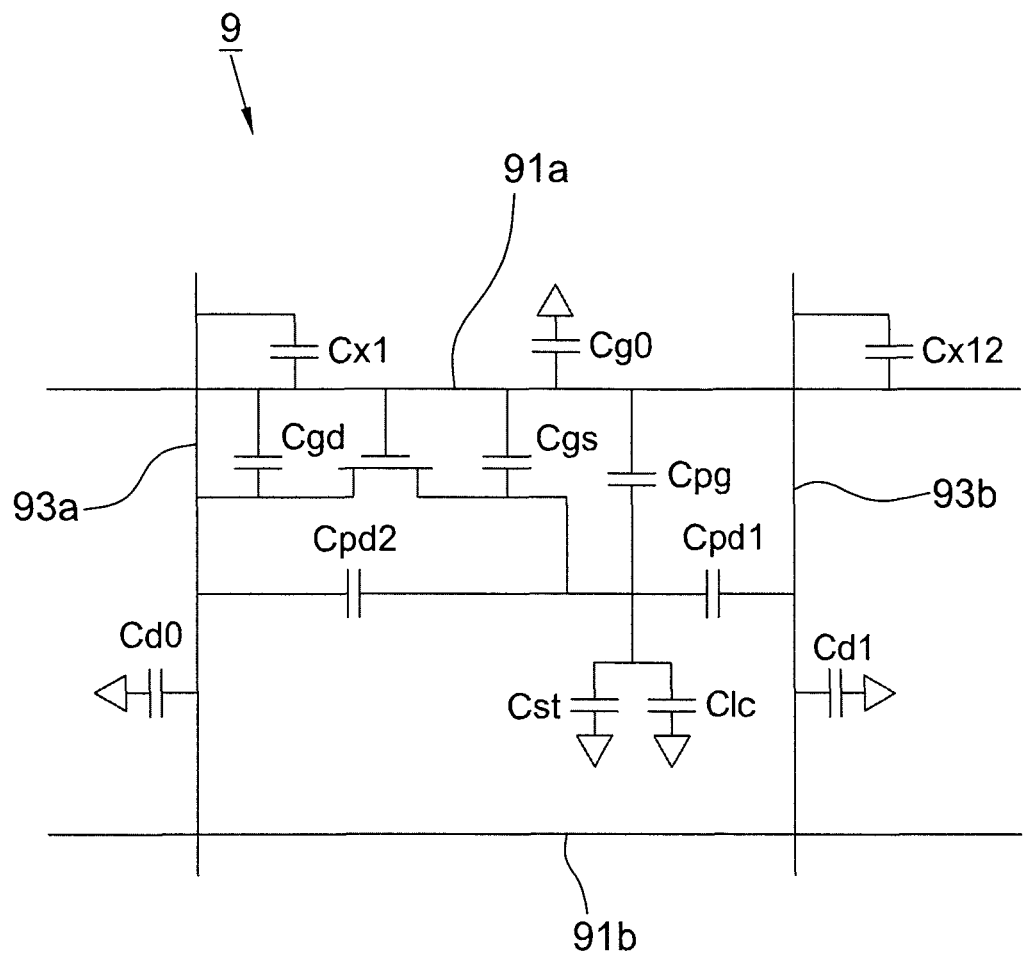
FIG. 3 is a schematic view showing the connection between capacitors in a pixel structure in the prior art.
Figure 4A:
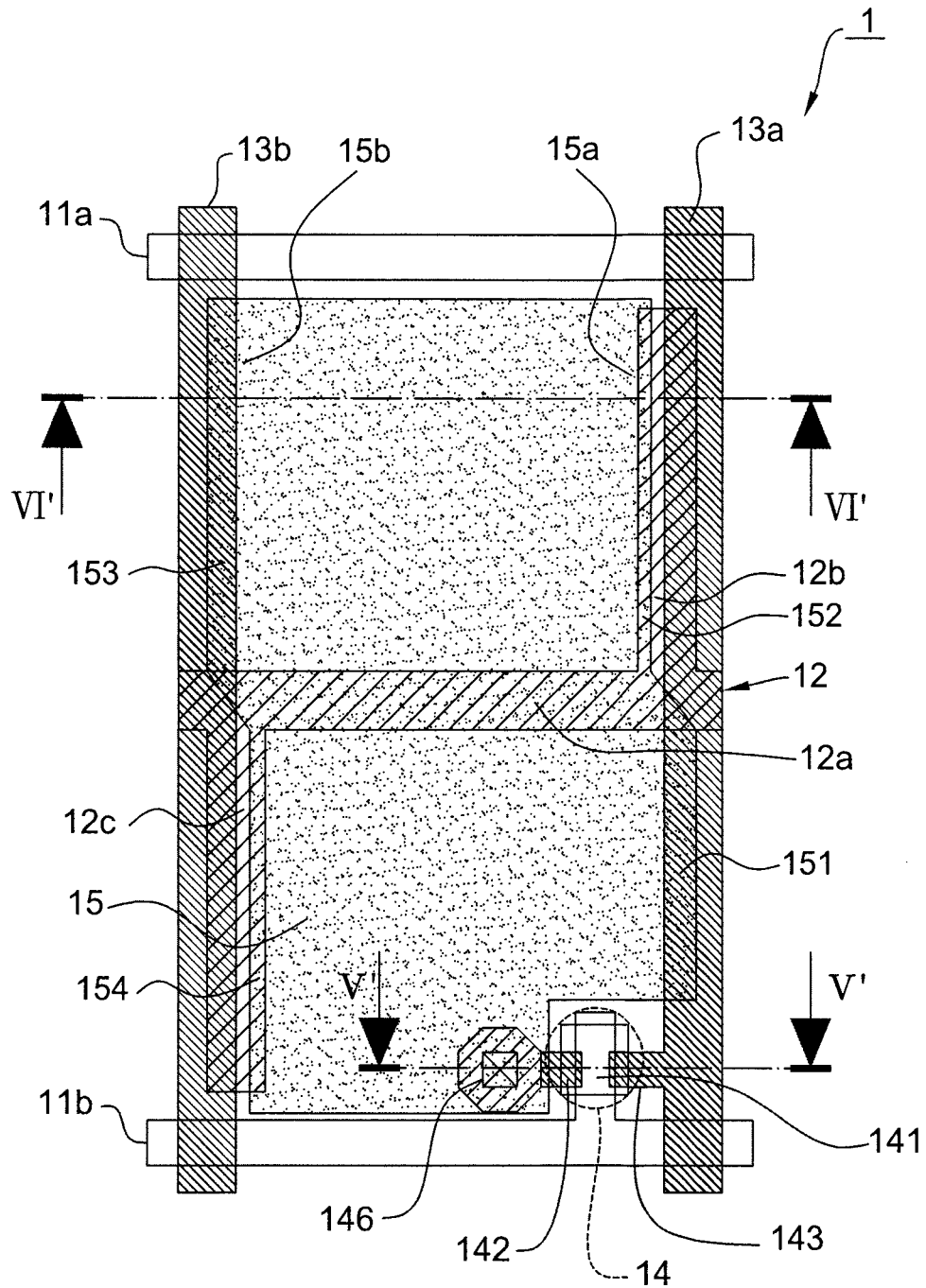
FIG. 4a is a plan view of the pixel structure of a liquid crystal display panel according to a first embodiment of the present invention.

Referring to FIG. 4a, it shows a top plan view of the pixel structure 1 of a liquid crystal display panel according to the first embodiment of the present invention. The pixel structure 1 includes a first gate line 11a, a second gate line 11b, a conductive line 12, a first data line 13a and a second data line 13b. The second gate line 11b and the first gate line 11a are laterally parallel to each other. The conductive line 12 includes a common line 12a and first and second light shielding elements 12b, 12c. The first and second light shielding elements 12b, 12c are longitudinally parallel to each other, and the common line 12a is electrically connected to the first and second light shielding elements 12b, 12c. The first data line 13a is perpendicular to the first gate line 11a, the second gate line 11b and the common line 12a. Also, the first data line 13a is disposed along the first light shielding element 12b, and is partially overlapped with the first light shielding element 12b. The second data line 13b is parallel to the first data line 13a. Also, the second data line 13b is disposed along the second light shielding element 12c, and is partially overlapped with the second light shielding element 12c. The first gate line 11a, the second gate line 11b, the first data line 13a and the second data line 13b together define a pixel region. It is apparent to one of ordinary skill in the art that the pixel structure 1 can also include a plurality of pixel regions.

The first gate line 11a and the second gate line 11b are served as scan lines. The first and second gate lines 11a, 11b and the conductive line 12 are formed by the same photolithography & etching processes, and hence the first and second gate lines 11a, 11b and the conductive line 12 are referred to first metal layer (M1) herein. After the first metal layer is formed, the first and second data lines 13a, 13b are formed by the same photolithography & etching processes, and hence the first and second data lines 13a, 13b are referred to second metal layer (M2) herein. In this embodiment, the conductive line 12 is made of conductive material, and the first and second light shielding elements 12b, 12c are adapted to block light leakage at the edge of the pixel structure 1.

The area of the black matrix (not shown) between two adjacent pixels can be reduced by disposing the first and second light shielding elements 12b, 12c of the conductive line 12 to block light leakage at the edge of a pixel region so as to increase the transmission rate of a single pixel structure, thereby increasing the aperture ratio of the pixel structure 1.

Figure 4B:
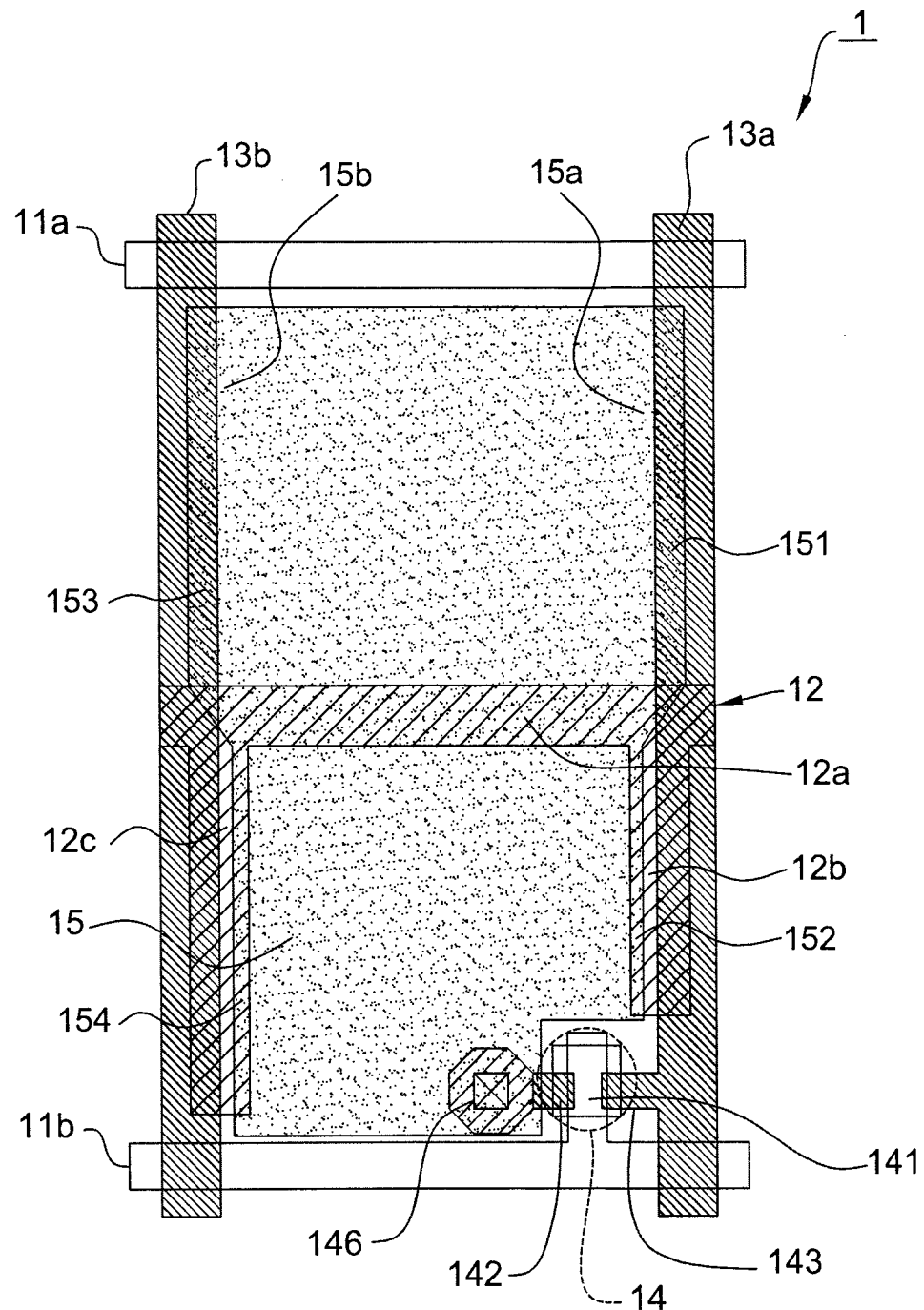
FIG. 4b is a plan view of the pixel structure of a liquid crystal display panel according to another embodiment of the present invention.

A thin film transistor 14 is disposed adjacent to an intersection of the second gate line 11b and the first data line 13a. The thin film transistor 14 includes a gate electrode 141, a source electrode 142 and a drain electrode 143, wherein the gate electrode 141 is extended from the second gate line 11b. A pixel electrode 15 is deposited over the pixel region. The pixel electrode 15 has a first side 15a, which includes a first portion 151 and a second portion 152. The first portion 151 is overlapped with the first data line 13a, and is not overlapped with the first light shielding element 12b. The second portion 152 is overlapped with the first light shielding element 12b, and is not overlapped with the first data line 13a. Also, the pixel electrode 15 has a second side 15b, which includes a third portion 153 and a fourth portion 154. The third portion 153 is overlapped with the second data line 13b, and is not overlapped with the second light shielding element 12c. The fourth portion 154 is overlapped with the second light shielding element 12c, and is not overlapped with the second data line 13b. In this embodiment, the first portion 151 and the third portion 153 are symmetrical at the right and lower position and the left and upper position, and the second portion 152 and the fourth portion 154 are symmetrical at the right and upper position and the left and lower position, shown in FIG. 4a. In another embodiment, the first portion 151 and the third portion 153 are symmetrical at the right position and the left position, and the second portion 152 and the fourth portion 154 are symmetrical at the right position and the left position, shown in FIG. 4b. According to the pixel structure 1 of this embodiment and another embodiment, the parasitic capacitance Cpd existed between the pixel electrode 15 and the data lines 13a, 13b can be half decreased, thereby reducing the coupling ratio of the data lines 13a, 13b in a single pixel region, and further reducing crosstalk. Furthermore, an overlapping portion of the pixel electrode 15 and the conductive line 12 can be served as storage capacitor.

Figure 4C:
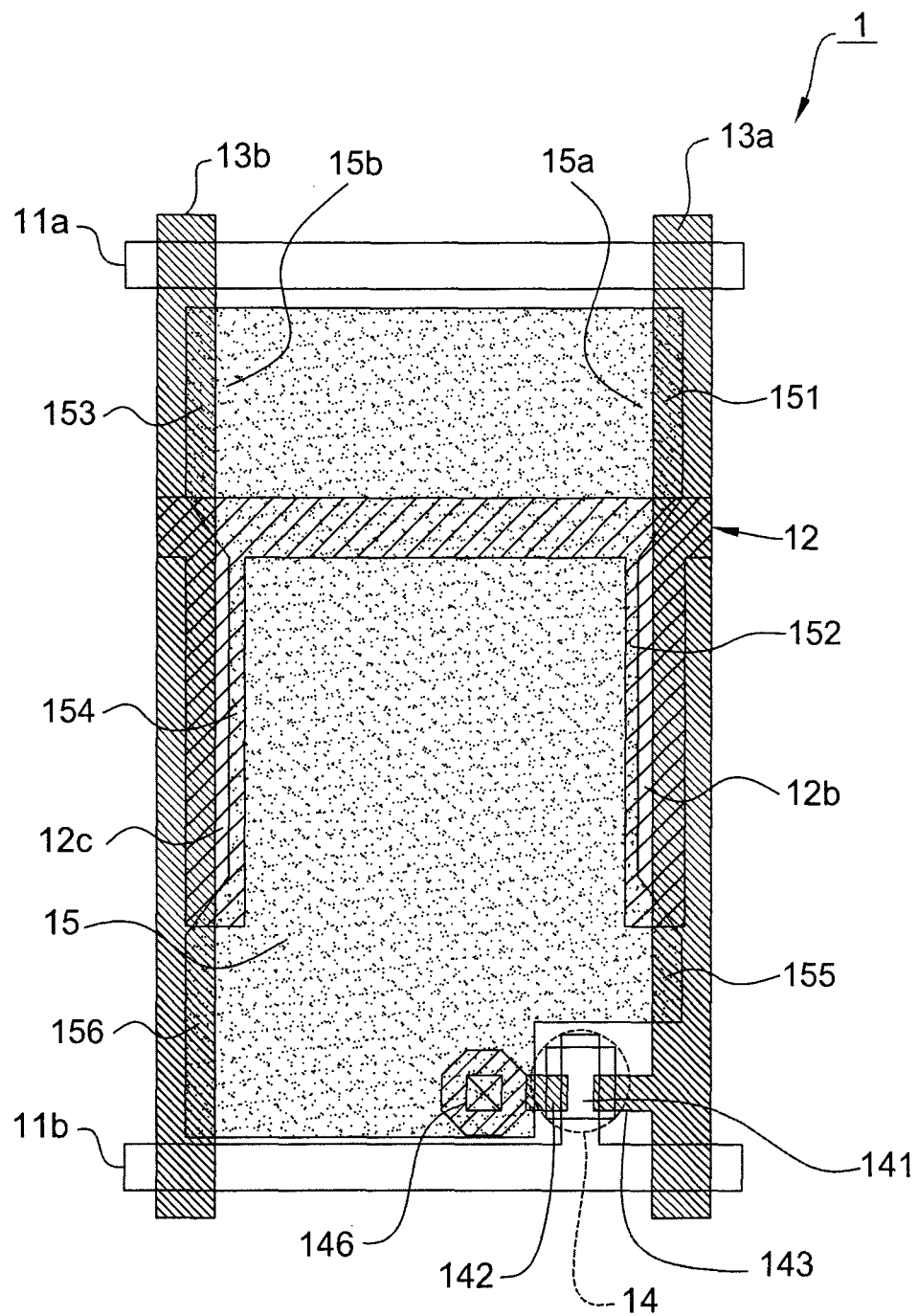
FIG. 4c is a plan view of the pixel structure of a liquid crystal display panel according to a further embodiment of the present invention.

In a further embodiment, the first side 15a further includes a fifth portion 155, wherein the fifth portion 155 is overlapped with the first data line 13a, and is not overlapped with the first light shielding element 12b. Also, the second side 15b further includes a sixth portion 156, wherein the sixth portion 156 is overlapped with the second data line 13b, and is not overlapped with the second light shielding element 12c, shown in FIG. 4c. According to the pixel structure 1 of a further embodiment, the parasitic capacitance Cpd existed between the pixel electrode 15 and the data lines 13a, 13b can be half decreased, thereby reducing the coupling ratio of the data lines 13a, 13b in a single pixel region, and further reducing crosstalk.

Figures 5A, 5B:
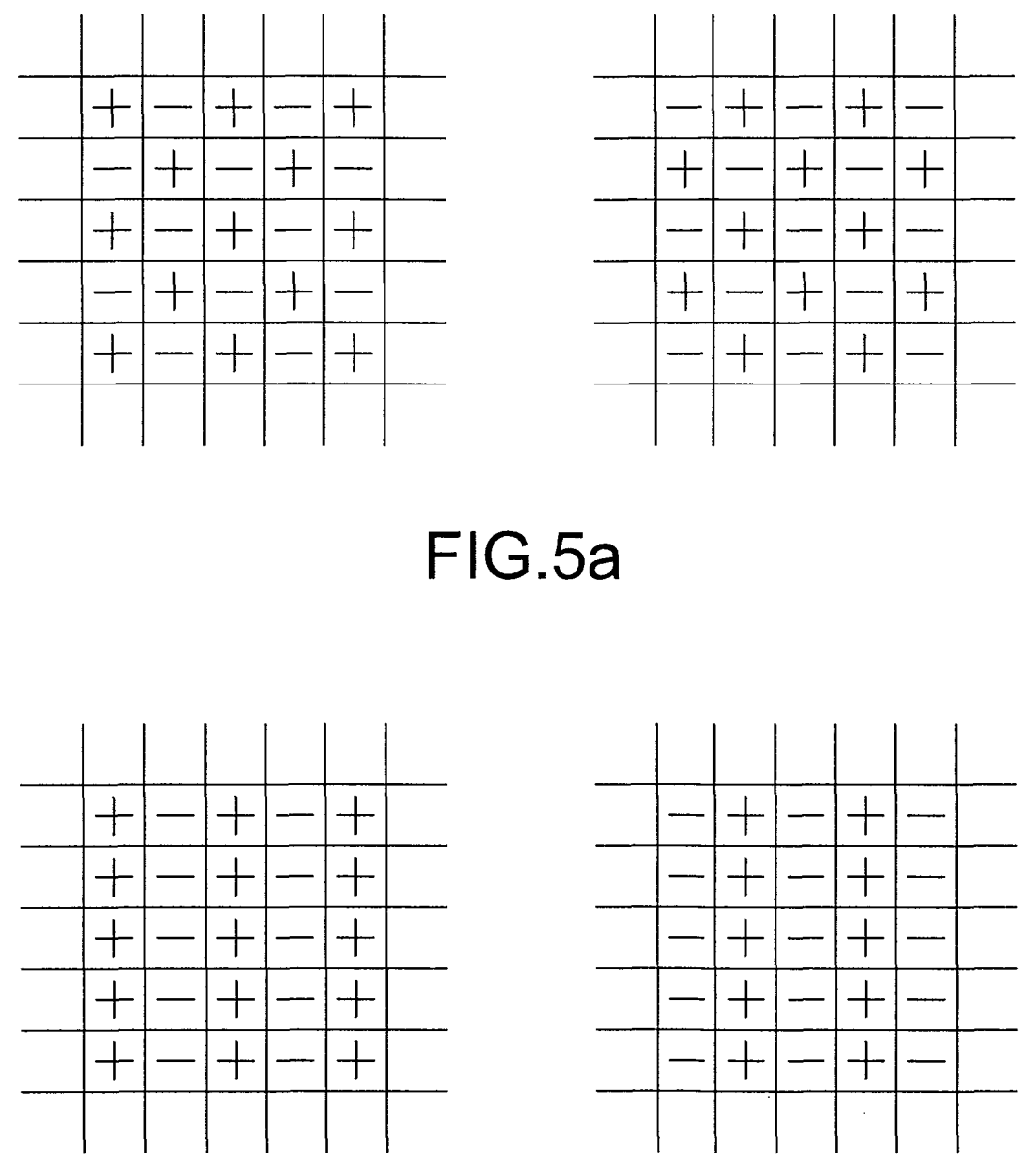

In addition, the present invention provides a method for driving a liquid crystal display panel. Referring to FIG. 5a, the liquid crystal display panel is operated in a dot inversion mode, or referring to FIG. 5b, the liquid crystal display panel is operated in a column inversion mode. The pixel structure 1 includes a plurality of pixel regions, which are adjacent to one another. By utilizing the two adjacent pixel regions having opposite polarity, it can get a formula: "|Cpd1+Cpd2|<|Cpd1|+|Cpd2|," thereby reducing the coupling ratio of two data lines in a single pixel region, wherein Cpd1 and Cpd2 are parasitic capacitance existed between the pixel electrode and two adjacent data lines respectively, |Cpd1+Cpd1| is the absolute value of the sum of Cpd1 and Cpd2, and |Cpd1|+|Cpd2| is the sum of the absolute value of Cpd1 and the absolute value of Cpd2. Preferably, the overlapping area between the pixel electrode 15 and the first data line 13a is substantially equal to the overlapping area between the pixel electrode 15 and the second data line 13b, whereby the value of |Cpd1| is substantially equal to the value of |Cpd2|. When the pixel region of the liquid crystal display panel is operated, the pixel region is induced by coupled voltages of opposite polarity from the first and second data lines 13a, 13b, Cpd1 and Cpd2 can be offset (i.e. compensated) to each other, thereby further reducing crosstalk. According to the pixel structure 1 of this embodiment and another embodiment, for example, the overlapping area between the first portion 151 of the pixel electrode 15 and the first data line 13a is substantially equal to the overlapping area between the third portion 153 of the pixel electrode 15 and the second data line 13b. According to the pixel structure 1 of a further embodiment, the sum of the overlapping area between the first portion 151 of the pixel electrode 15 and the first data line 13a and the overlapping area between the fifth portion 155 of the pixel electrode 15 and the first data line 13a is substantially equal to the sum of the overlapping area between the third portion 153 of the pixel electrode 15 and the second data line 13b and the overlapping area between the sixth portion 156 of the pixel electrode 15 and the second data line 13b.

Figure 6A:
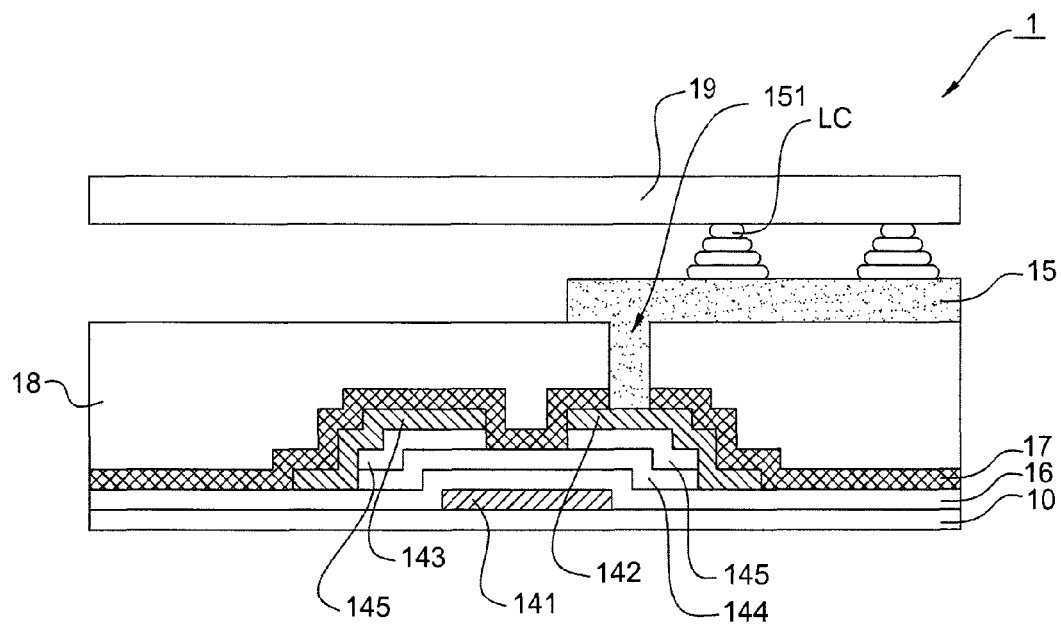
FIG. 6a is a cross-sectional view taken along the line V'-V' of the pixel structure shown in FIG. 4a, wherein the pixel structure includes an organic layer.
Figure 6B:
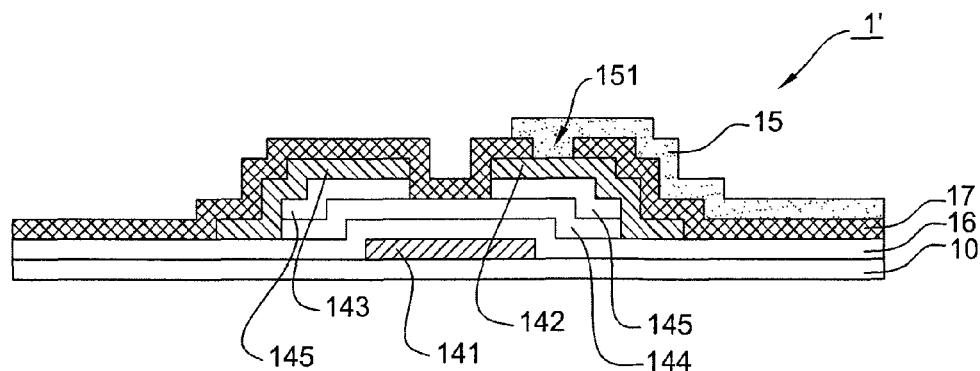
FIG. 6b is a cross-sectional view taken along the line V'-V' of the pixel structure shown in FIG. 4a, wherein the pixel structure does not include an organic layer.
Figure 7A:
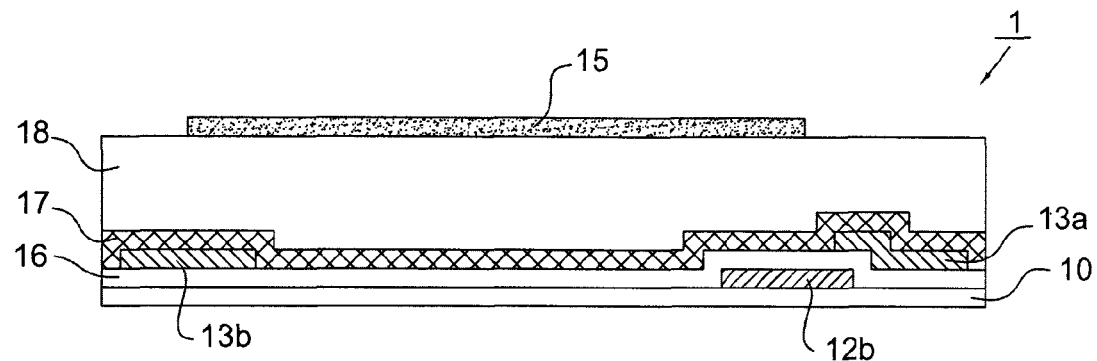
FIG. 7a is a cross-sectional view taken along the line VI'-VI' of the pixel structure shown in FIG. 4a, wherein the pixel structure includes an organic layer.
Figure 7B:
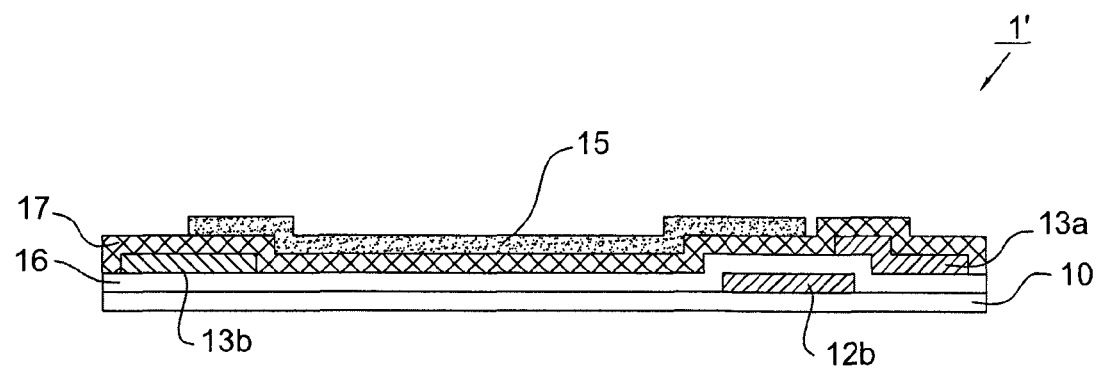
FIG. 7b is a cross-sectional view taken along the line VI'-VI' of the pixel structure shown in FIG. 4a, wherein the pixel structure does not include an organic layer.

Referring to FIGS. 6a, 6b, 7a and 7b, FIGS. 6a and 6b show cross-sectional views taken along the line V'-V' of the pixel structure 1 shown in FIG. 4a, and FIGS. 7a and 7b show cross-sectional views taken along the line VI'-VI' of the pixel structure 1 shown in FIG. 4a. FIGS. 6a and 7a show an example of the pixel structure 1 according to the first embodiment of the present invention having an organic layer and it is a structure of storage capacitor on common (Cst on common). The pixel structure 1 includes a lower substrate 10, e.g. a glass substrate. The gate electrode 141, the common line 12a, and the first and second light shielding elements 12b, 12c of the conductive line 12 (first metal layer) are directly formed on the substrate 10. A first insulating layer, e.g. gate insulating layer 16 is deposited on the lower substrate 10 to cover the gate electrode 141, the common line 12a, and the first and second light shielding elements 12b, 12c of the conductive line 12. An amorphous silicon layer 144 and a doping layer 145 are successively deposited on the gate insulating layer 16 over the gate electrode 141. A source electrode 142 and a drain electrode 143 are formed above both sides of the gate electrode 141 respectively, shown as FIG. 6a. The first data line 13a and the second data line 13b are formed on the gate insulating layer 16. The source electrode 142, the drain electrode 143, the first data line 13a and the second data line 13b are patterned by the same photolithography & etching process (second metal layer). A second insulating layer, e.g. inorganic passivation layer 17 is formed on the gate insulating layer 16 so as to cover the source electrode 142, the drain electrode 143, the first data line 13a and the second data line 13b. An organic layer 18 is directly formed on the passivation layer 17, wherein the organic layer 18 has a thickness such as 3 micrometers. A pixel electrode 15 is directly deposited on the organic layer 18. A contact hole 146 is formed through the organic layer 18 and the passivation layer 17 such that the pixel electrode 15 can be electrically connected to the source electrode 142 through the contact hole 146. In addition, the pixel structure 1 further includes an upper substrate 19 and a liquid crystal layer LC, wherein the upper substrate 19 is opposite to the lower substrate 10, and the liquid crystal layer LC is sandwiched between the lower substrate 10 and the upper substrate 19.

In this embodiment, the material of the passivation layer 17 may be, but not limited to, silicon nitride, silicon oxy-nitride or silicon oxide. The material of the pixel electrode 15 is transparent conductive material, such as, but not limited to, indium tin oxide (ITO), indium zinc oxide (IZO) or aluminum doped zinc oxide (AZO).

FIGS. 6b and 7b show an example of the pixel structure 1 according to the first embodiment of the present invention without an organic layer. The differences between the pixel structure 1' shown in FIGS. 6b and 7b and the pixel structure 1 shown in FIGS. 6a and 7a are that, the pixel electrode 15 is directly deposited on the passivation layer 17, and a contact hole 146 is formed through the passivation layer 17 for electrically connecting the pixel electrode 15 to the source electrode 142 of the thin film transistor 14, wherein the thickness of the passivation layer 17 can be increased to between 4500 Å and 9000 Å. In addition, the disposition of other elements is similar to that shown in FIGS. 6a and 7a and details will not be illustrated herein. Since it is necessary that the organic layer 18 is formed in this example, it is able to simplify the structure and reduce the manufacturing cost. Furthermore, the pixel structure 1' shown in FIGS. 6b and 7b can also achieve the function of the pixel structure 1 shown in FIGS. 6a and 7a, wherein the function is to reduce the coupling ratio of the data lines in a single pixel region.

Figure 8:
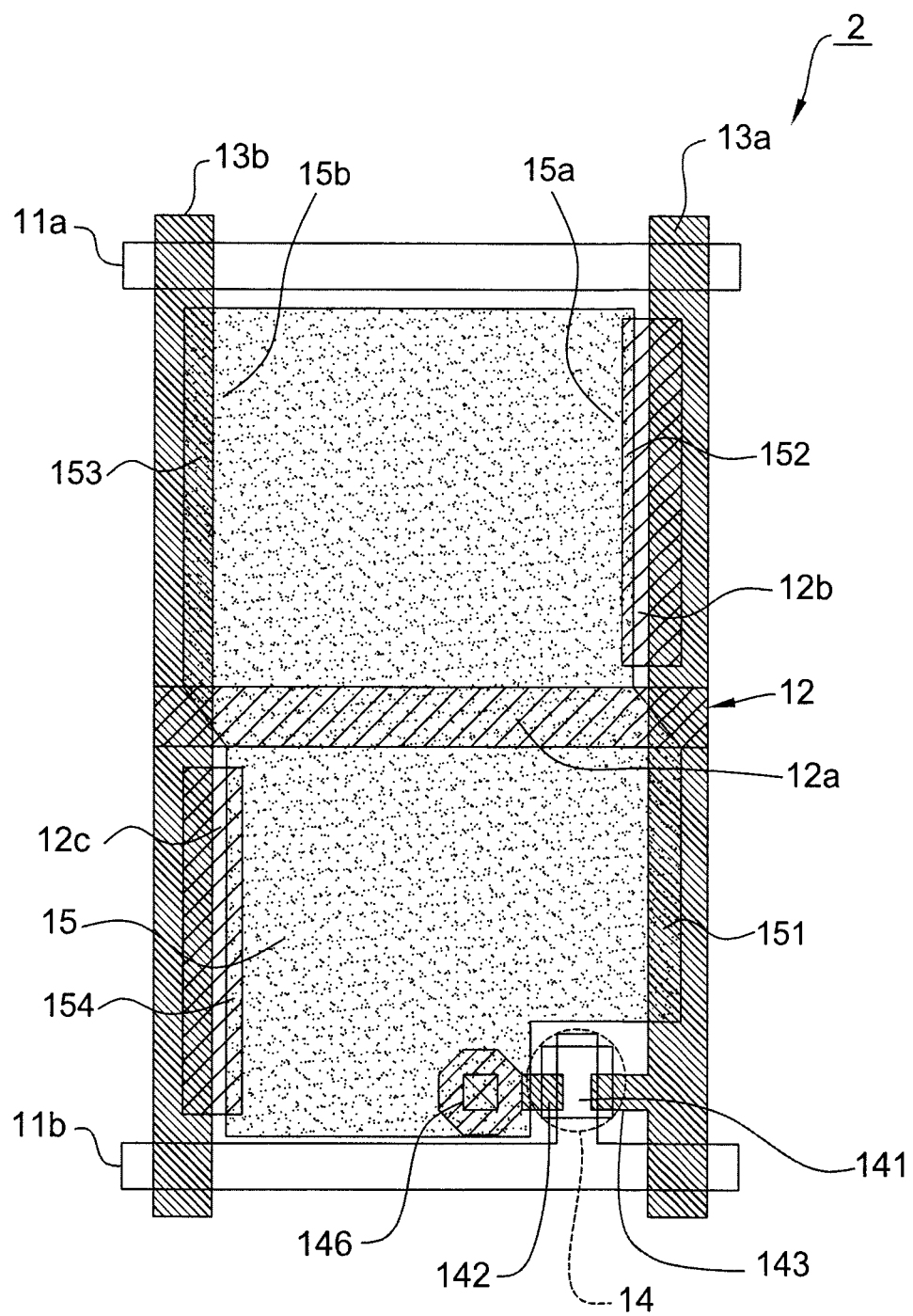
FIG. 8 is a plan view of the pixel structure of a liquid crystal display panel according to a second embodiment of the present invention.

Referring to FIG. 8, it shows a top plan view of the pixel structure 2 according to the second embodiment of the present invention. The difference between the pixel structure 2 in the second embodiment and the pixel structure 1 in the first embodiment (shown in FIG. 4a) is that the first light shielding elements 12b is separated from the common line 12a, and the second light shielding elements 12c is separated from the common line 12a. Thus, the first and second light shielding elements 12b, 12c can be made of conductive or insulating material. In addition, the deposition of other elements in the second embodiment is similar to that in the first embodiment shown in FIG. 4a and details will not be illustrated herein. Similarly, the second embodiment of the present invention also includes the example having an organic layer (as those shown in FIGS. 6a and 7a) and the example without an organic layer (as those shown in FIGS. 6b and 7b).

Figure 9:
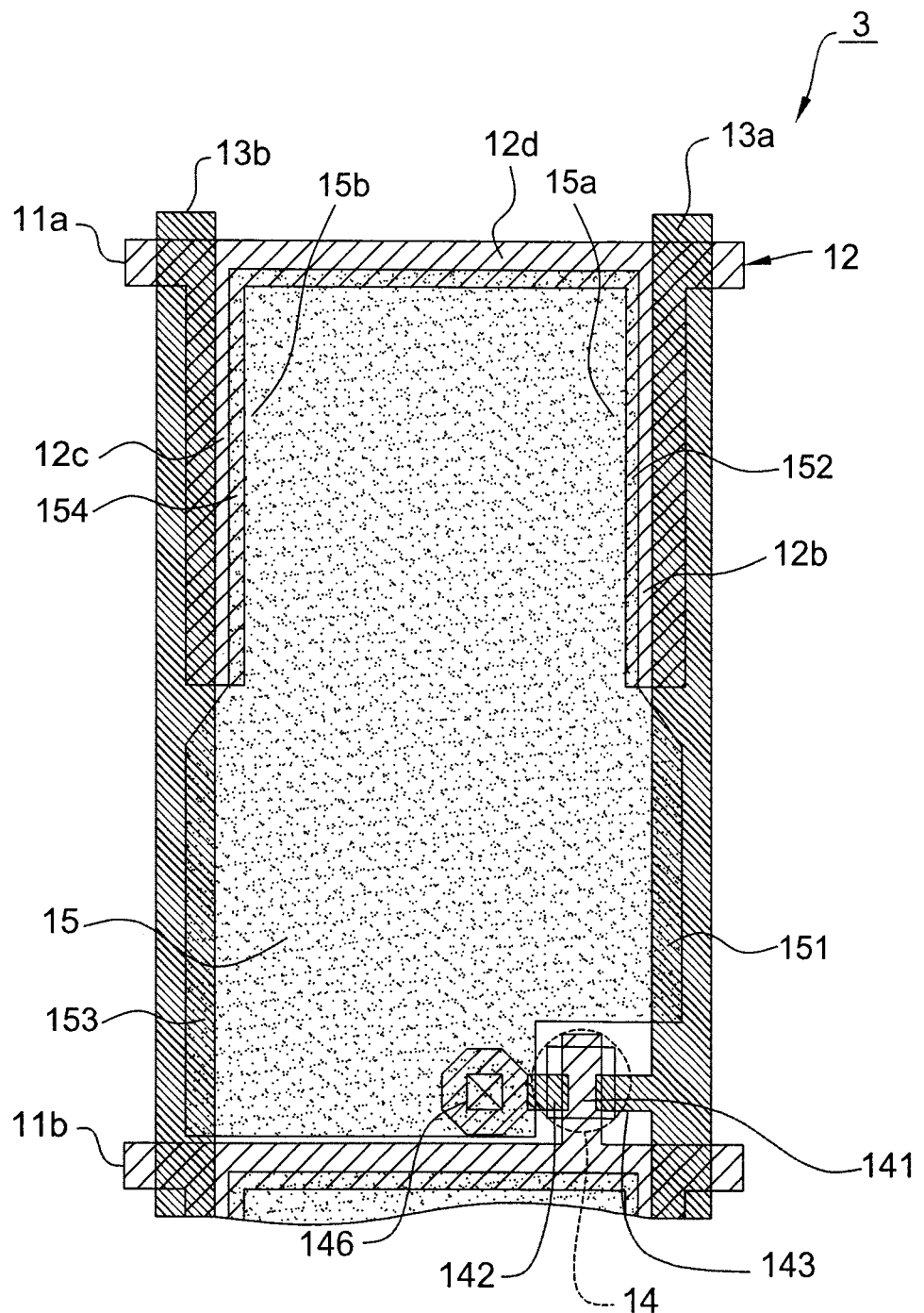
FIG. 9 is a plan view of the pixel structure of a liquid crystal display panel according to a third embodiment of the present invention.

Referring to FIG. 9, it shows a top plan view of the pixel structure 3 of a liquid crystal display according to the third embodiment of the present invention. The pixel structure 3 includes a first gate line 11a, a second gate line 11b, a first data line 13a, a second data line 13b and a conductive line 12. The conductive line 12 includes a line portion 12d, and first and second light shielding elements 12b, 12c. The line portion 12d is electrically connected to the first and second light shielding elements 12b, 12c, and is a part of the first gate line 11a. The first and second light shielding elements 12b, 12c are longitudinally disposed. The first data line 13a is perpendicular to the first gate line 11a and the second gate line 11b. Also, the first data line 13a is disposed along the first light shielding element 12b, and is partially overlapped with the first light shielding element 12b. The second data line 13b is parallel to the first data line 13a. Also, the second data line 13b is disposed along the second light shielding element 12c and is partially overlapped with the second light shielding element 12c. The first gate line 11a, the second gate line 11b, the first data line 13a and the second data line 13b together define a pixel region. It is apparent to one of ordinary skill in the art that the pixel structure 3 can also include a plurality of pixel regions. The difference between the pixel structure 3 in the third embodiment and the pixel structure 1 in the first embodiment (shown in FIG. 4a) is that the pixel region 3 is the structure of storage capacitor (Cst) on gate, i.e. the pixel structure 3 does not include any common line.

The first gate line 11a and the second gate line 11b are served as scan lines. The first and second gate lines 11a, 11b and the conductive line 12 are formed by the same photolithography & etching processes, and hence the first and second gate lines 11a, 11b and the conductive line 12 are referred to first metal layer (M1) herein. After the first metal layer is formed, the first and second data lines 13a, 13b are formed by the same photolithography & etching processes, and hence the first and second data lines 13a, 13b are referred to second metal layer (M2) herein. In this embodiment, the conductive line 12 is made of conductive material, and the first and second light shielding elements 12b, 12c are adapted to block light leakage at the edge of the pixel structure 3.

The area of the black matrix (not shown) between two adjacent pixels can be reduced by disposing the first and second light shielding elements 12b, 12c of the conductive line 12 to block light leakage at the edge of a pixel region so as to increase the transmission rate of a single pixel structure, thereby increasing the aperture ratio of the pixel structure 3.

A thin film transistor 14 is disposed adjacent to an intersection of the second gate line 11b and the first data line 13a. The thin film transistor 14 includes a gate electrode 141, a source electrode 142 and a drain electrode 143, wherein the gate electrode 141 is extended from the second gate line 11b. A pixel electrode 15 is deposited over the pixel region. The pixel electrode 15 has a first side 15a, which includes a first portion 151 and a second portion 152. The first portion 151 is overlapped with the first data line 13a, and is not overlapped with the first light shielding element 12b. The second portion 152 is overlapped with the first light shielding element 12b, and is not overlapped with the first data line 13a. Also, the pixel electrode 15 has a second side 15b, which includes a third portion 153 and a fourth portion 154. The third portion 153 is overlapped with the second data line 13b, and is not overlapped with the second light shielding element 12c. The fourth portion 154 is overlapped with the second light shielding element 12c, and is not overlapped with the second data line 13b. According to the pixel structure 3 of this embodiment, the parasitic capacitance Cpd existed between the pixel electrode 15 and the data lines 13a, 13b can be half decreased, thereby reducing the coupling ratio of the data lines in a single pixel region, and further reducing crosstalk. Furthermore, an overlapping portion of the pixel electrode 15 and the conductive line 12 can be served as storage capacitor.

In addition, the liquid crystal display panel is operated in a dot inversion mode or a column inversion mode. By utilizing the two adjacent pixel regions having opposite polarity, it can get a formula: "$|Cpd1+Cpd2|<|Cpd1|+|Cpd2|$", thereby reducing the coupling ratio of two data lines in a single pixel region, wherein Cpd1 and Cpd2 are parasitic capacitance existed between the pixel electrode and two adjacent data lines respectively, $|Cpd1+Cpd1|$ is the absolute value of the sum of Cpd1 and Cpd2, and $|Cpd1+Cpd2|$ is the sum of the absolute value of Cpd1 and the absolute value of Cpd2. Preferably, the overlapping area between the pixel electrode 15 and the first data line 13a is substantially equal to the overlapping area between the pixel electrode 15 and the second data line 13b, whereby the value of $|Cpd1|$ is substantially equal to the value of $|Cpd2|$. When the pixel region of the liquid crystal display panel is operated, the pixel region is induced by coupled voltages of opposite polarity from the first and second data lines 13a, 13b, Cpd1 and Cpd2 can be offset (i.e. compensated) to each other, thereby further reducing crosstalk. According to the pixel structure 3 of this embodiment, for example, the overlapping area between the first portion 151 of the pixel electrode 15 and the first data line 13a is substantially equal to the overlapping area between the third portion 153 of the pixel electrode 15 and the second data line 13b.

The deposition of other elements in the third embodiment is similar to that in the first embodiment shown in FIG. 4a and details will not be illustrated herein. Similarly, the third embodiment of the present invention also includes the example having an organic layer (as those shown in FIGS. 6a and 7a) and the example without an organic layer (as those shown in FIGS. 6b and 7b).

Figure 10:
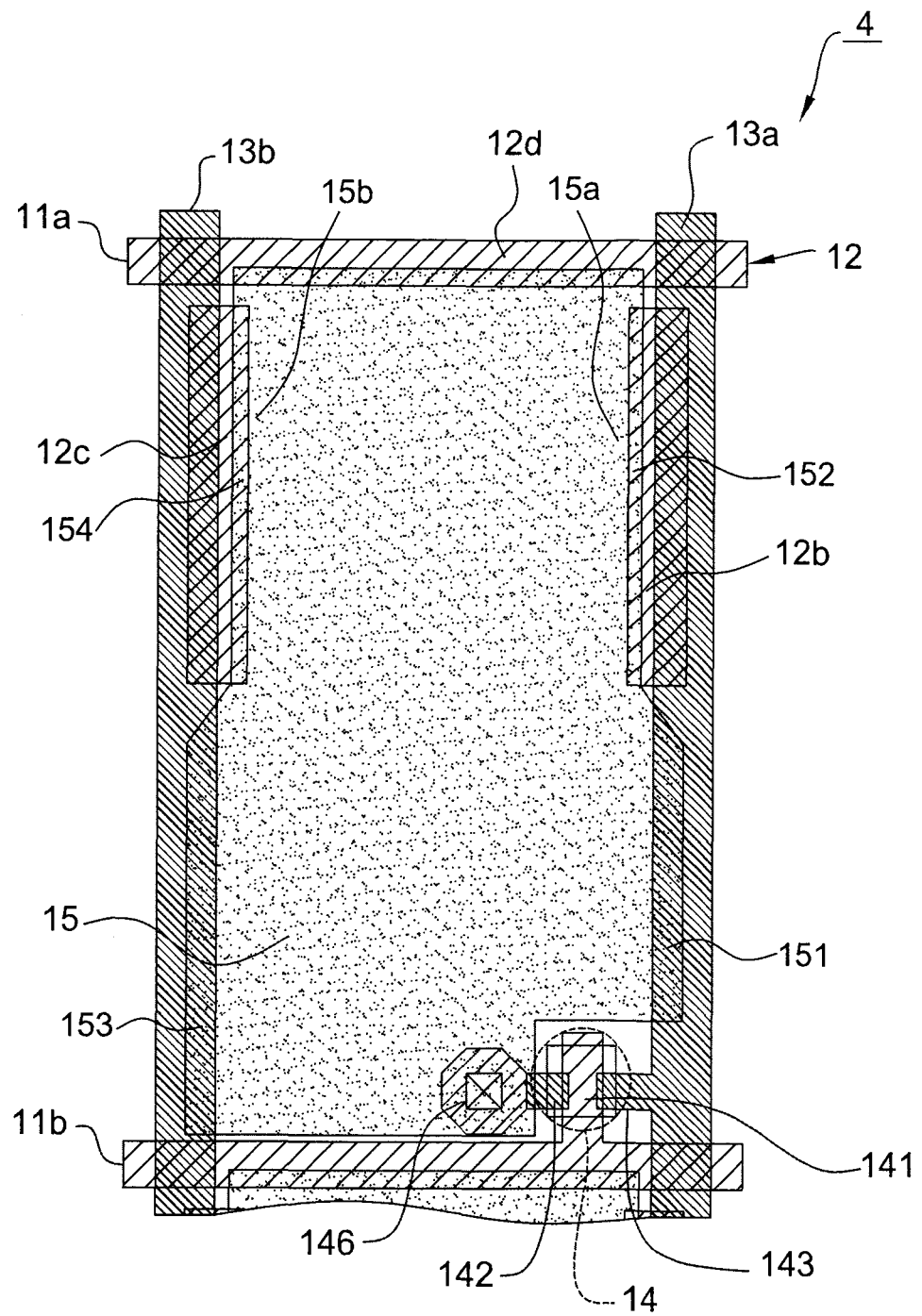
FIG. 10 is a plan view of the pixel structure of a liquid crystal display panel according to a fourth embodiment of the present invention.

Referring to FIG. 10, it shows a top plan view of the pixel structure 4 according to the fourth embodiment of the present invention. The pixel structure 4 shown in FIG. 10 is substantially similar to the pixel structure 3 shown in FIG. 9, wherein the same elements are designated with the same reference numerals. The difference between the fourth embodiment and the third embodiment is that the first light shielding elements 12b is separated from the line portion 12d, and the second light shielding elements 12c is separated from the line portion 12d. Thus, the first and second light shielding elements 12b, 12c can be made of conductive or insulating material. In addition, the deposition of other elements in the pixel structure 4 shown in FIG. 10 is similar to that in the pixel structure 3 shown in FIG. 9 and details will not be illustrated herein. Similarly, the fourth embodiment of the present invention also includes the example having an organic layer (as those shown in FIGS. 6a and 7a) and the example without an organic layer (as those shown in FIGS. 6b and 7b).

Although the invention has been explained in relation to its preferred embodiment, it is not used to limit the invention. It is to be understood that m any other possible modifications and variations can be made by those skilled in the art without departing from the spirit and scope of the invention as hereinafter claimed.

What is claimed is:

1. A pixel structure of a liquid crystal display panel, the pixel structure comprising:
   a substrate;
   a first metallic layer disposed above the substrate and comprising first and second gate lines laterally parallel to each other;
   a first light shielding element longitudinally disposed above the substrate;

a second light shielding element parallel to the first light shielding element;
a second metallic layer disposed above the first light shielding element and comprising:
  a first data line disposed along the first light shielding element and partially overlapped with the first light shielding element; and
  a second data line parallel to the first data line, wherein the second data line is disposed along the second light shielding element, and is partially overlapped with the second light shielding element the first gate line, the second gate line, the first data line and the second data line together define a pixel region; and
a pixel electrode having a first side and a second side, the first side including a first portion and a second portion, the second side including a third portion and a fourth portion, wherein the first portion is overlapped with the first data line but not overlapped with the first light shielding element, the second portion is overlapped with the first light shielding element but not overlapped with the first data line, the third portion is overlapped with the second data line but not overlapped with the second light shielding element, and the fourth portion is overlapped with the second light shielding element but not overlapped with the second data line.

2. The pixel structure as claimed in claim 1, wherein the overlapping area between the pixel electrode and the first data line is substantially equal to the overlapping area between the pixel electrode and the second data line.

3. The pixel structure as claimed in claim 1, wherein the overlapping area between the first portion of the pixel electrode and the first data line is substantially equal to the overlapping area between the third portion of the pixel electrode and the second data line.

4. The pixel structure as claimed in claim 1, wherein the first portion and the third portion are symmetrical at the right and lower position and the left and upper position, and the second portion and the fourth portion are symmetrical at the right and upper position and the left and lower position.

5. The pixel structure as claimed in claim 1, wherein the first portion and the third portion are symmetrical at the right position and the left position, and the second portion and the fourth portion are symmetrical at the right position and the left position.

6. The pixel structure as claimed in claim 1, wherein:
the first side further comprises a fifth portion, the fifth portion is overlapped with the first data line, and the fifth portion is not overlapped with the first light shielding element; and
the second side further comprises a sixth portion, the sixth portion is overlapped with the second data line, and the sixth portion is not overlapped with the second light shielding element.

7. The pixel structure as claimed in claim 6, wherein the sum of the overlapping area between the first portion of the pixel electrode and the first data line and the overlapping area between the fifth portion of the pixel electrode and the first data line is substantially equal to the sum of the overlapping area between the third portion of the pixel electrode and the second data line and the overlapping area between the sixth portion of the pixel electrode and the second data line.

8. The pixel structure as claimed in claim 1, further comprising a common line electrically connected to the first and second light shielding elements.

9. The pixel structure as claimed in claim 1, further comprising a line portion electrically connected to the first and second light shielding elements and being a part of the first gate line.

10. The pixel structure as claimed in claim 1, wherein the first and second light shielding elements are made of insulating material.

11. The pixel structure as claimed in claim 1, wherein the first and second light shielding elements are made of conductive material.

12. The pixel structure as claimed in claim 1, wherein the first and second light shielding elements and the first metallic layer are made of same material.

13. The pixel structure as claimed in claim 1, wherein the pixel structure comprises a plurality of pixel regions, gate lines and data lines, each pixel region is defined by the two adjacent gate lines and the two adjacent data lines, the pixel regions are adjacent to one another, and the two adjacent pixel regions have opposite polarity.

14. A liquid crystal display panel, comprising:
a lower substrate;
a pixel structure comprising:
  a first metallic layer disposed above the lower substrate and comprising first and second gate lines laterally parallel to each other;
  a first light shielding element longitudinally disposed above the lower substrate;
  a second light shielding element parallel to the first light shielding element;
  a second metallic layer disposed above the first light shielding element and comprising:
    a first data line disposed along the first light shielding element and partially overlapped with the first light shielding element; and
    a second data line parallel to the first data line, wherein the second data line is disposed along the second light shielding element, and is partially overlapped with the second light shielding element the first gate line, the second gate line, the first data line and the second data line together define a pixel region; and
  a pixel electrode having a first side and a second side, the first side including a first portion and a second portion, the second side including a third portion and a fourth portion, wherein the first portion is overlapped with the first data line but not overlapped with the first light shielding element, the second portion is overlapped with the first light shielding element but not overlapped with the first data line, the third portion is overlapped with the second data line but not overlapped with the second light shielding element, and the fourth portion is overlapped with the second light shielding element but not overlapped with the second data line
an upper substrate opposite to the lower substrate; and
a liquid crystal layer sandwiched between the lower substrate and the upper substrate.

15. The liquid crystal display panel as claimed in claim 14, wherein the overlapping area between the pixel electrode and the first data line is substantially equal to the overlapping area between the pixel electrode and the second data line.

* * * * *